United States Patent [19]
Labozzetta

[11] Patent Number: 5,107,269
[45] Date of Patent: Apr. 21, 1992

[54] DEVICE FOR THE AUTOMATIC CORRECTION OF THE DIFFERENTIAL ERROR, TO BE APPLIED PREFERABLY TO MONOPULSE TYPE RADAR RECEIVER

[75] Inventor: Bruno Labozzetta, Rome, Italy

[73] Assignee: Selenia Industrie Elettroniche Associate S.p.A., Rome, Italy

[21] Appl. No.: 616,792

[22] Filed: Nov. 21, 1990

[30] Foreign Application Priority Data

Nov. 24, 1989 [IT] Italy ................. 48595 A/89

[51] Int. Cl.[5] .................... G01S 13/44; G01S 7/40
[52] U.S. Cl. ........................ 342/77; 342/149; 342/174
[58] Field of Search ............ 342/174, 151, 149, 77

[56] References Cited

U.S. PATENT DOCUMENTS 3,794,998 2/1974 Peason, Jr. et al. ............ 342/149
4,368,468 1/1983 Lisle et al. .................. 342/149

FOREIGN PATENT DOCUMENTS 1285053 8/1972 United Kingdom ............ 342/151
2039187 7/1980 United Kingdom ............ 342/149

*Primary Examiner*—Gilberto Barrón, Jr.
*Attorney, Agent, or Firm*—Cohen, Pontani & Lieberman

[57] ABSTRACT

A device for automatic correction of differential and deterministic errors in a radar receiver, preferably a monopulse radar receiver, which comprises a closed loop feedback system in which raw Off-Boresight Angle (OBA) data as well as current azimuth data are accumulated, averaged and linearized through linear aggression techniques. This linearized data is combined with data relating to pre-calibrated known antenna parameters. This combined data is fed back and combined with the raw OBA signal to produce a correction OBA signal. The corrected OBA signal is algebraically summed with the current known azimuth data produced by the radar receiver to produce a highly reliable error corrected instantaneous OBA value.

2 Claims, 1 Drawing Sheet

DEVICE FOR THE AUTOMATIC CORRECTION OF THE DIFFERENTIAL ERROR, TO BE APPLIED PREFERABLY TO MONOPULSE TYPE RADAR RECEIVER

FIELD OF THE INVENTION

The present invention relates to a device used in radar systems, primarily monopulse radar systems, for correcting the differential error contained in the raw Off-Boresight Angle (OBA) value obtained in such systems, especially when used for azimuth tracking. The system uses a closed loop linearization technique to eliminate deterministic errors commonly encountered in monopulse radar systems and thereby improve the overall effectiveness of the system in correcting the differential error of the OBA as obtained by the system.

BACKGROUND OF THE INVENTION

The present invention relates to an improvement in a radar receiver, which when applied to such a receiver can correct the differential error in the detected Off-Boresight Angle (OBA) of a target. This correction is achieved using a closed loop linearization technique which, in combination with correction for known antenna properties, results in improved differential error correction capability as well as substantial elimination of the deterministic errors commonly encountered in radar systems, especially monopulse systems.

Presently known systems use a simplistic technique for differential error correction. This technique comprises correcting the observed OBA of the target with values contained in a static lookup table. The values in the static lookup table are essentially known antenna parameters obtained through pre-calibration which would introduce an error in the observed azimuth angle if not corrected for. These presently known systems however, do not have the ability to correct for deterministic type errors which are introduced into the system as a result of antenna tolerances, construction methods and time and thermal variations introduced by various system components which, especially if such errors are in the same direction of the angular origin of the target signal, introduce a deterministic error in the detected OBA as a function of the current azimuth.

It would therefore be greatly advantageous to provide a system which is not only capable of correcting for differential errors through compensation for known limiting antenna parameters, but which also has the capability of eliminating the deterministic errors introduced by system components as well as time and thermal variations of system components.

OBJECTS AND SUMMARY OF THE INVENTION

The present invention can be used in a radar receiver, primarily a monopulse radar receiver, to automatically correct for the differential errors present in such systems in the detection of the angle between the known azimuth of antenna boresight axis and the azimuth of a detected target upon which the antenna boresight must be maintained.

The radar receiver receives a reflected radar signal from a target and outputs a value for the raw Off-Boresight Angle (OBA). This value along with the current measured azimuth of the antenna boresight axis are accumulated and stored in order. By storing in order it is meant that the OBA value is stored in the same order as the measured azimuth of the antenna for each of the returned reflected radar signals. From the accumulated values the averages are extracted and fed to a component which performs a linear regression to determine the linearization coefficients of the calculated averages. This linearized data is then combined through multiplication with data from a lookup table. The lookup table contains known reference values, based upon pre-calibration of the antenna, which must be factored in when determining the OBA to eliminate errors introduced into the system by the antenna itself. This linearized and corrected OBA information is then combined through multiplication with the raw OBA signal from the receiver to produce a corrected OBA signal. This corrected OBA signal is algebraically summed with the known azimuth value to produce an error corrected instantaneous OBA value. Through successive iterations of linearization and correction the resulting sum of the corrected OBA signal and the known azimuth value will be a constant. This corrected, highly accurate azimuth information can then be used by other commonly known components of monopulse radar systems for such known monopulse applications such as surveillance radar or tracking radar such as those used in air traffic control systems.

It is therefore an object of this invention to provide a device for use in a radar receiver, preferably a monopulse radar receiver, which can automatically correct for differential errors in the observed Off-Boresight Angle of the detected target.

It is a further object of this invention to provide a device for use in a radar receiver, preferably a monopulse radar receiver, which can in addition to correcting for differential error also substantially eliminate deterministic errors introduced into such systems by the tolerances of the material used in the antenna design and periodic and thermal variations normally present in such systems.

It is a still further object of this invention to provide for correction and elimination of differential and deterministic errors through the use of a closed loop adaptive feedback system which utilizes known antenna characteristics as well as statistical methods to provide a highly accurate Off-Boresight Angle measurement.

It is a still further object of the invention to provide a monopulse receiver system with improved Off-Boresight Angle measurement accuracy which also provides an improved degree of system fault detection as a result of the linearization of the Off-Boresight Angle measurement data.

Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

DETAILED DESCRIPTION OF THE DRAWINGS

Figure 1:
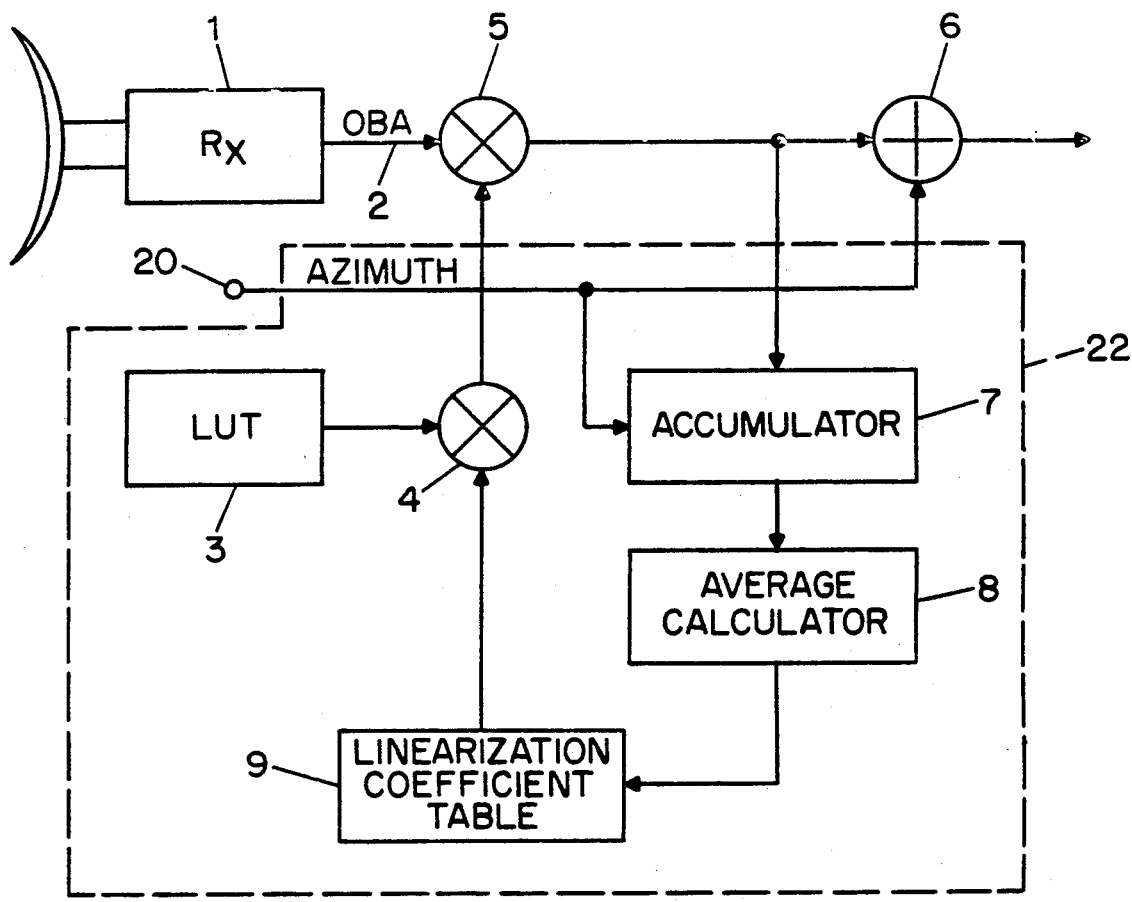
Figure 2:
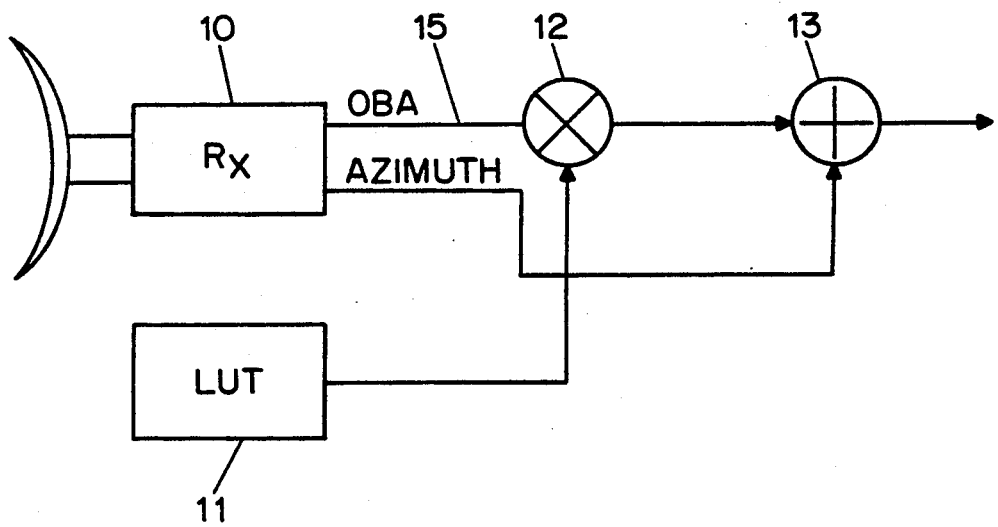

In the drawings:

FIG. 1 is a block diagrammatic representation of the automatic correction system of the present invention; and FIG. 2 is a block diagrammatic representation of a differential error correcting system known in the prior art.

DETAILED DESCRIPTION OF THE PRESENTLY PREFERRED EMBODIMENTS

With initial reference to FIG. 1, there is shown an error correction device constructed in accordance with the present invention wherein a radar receiver 1 produces at its output an Off-Boresight Angle (OBA) signal, which signal represents the angle between the known antenna boresight axis and the target detected within the antenna beam pattern. This raw OBA signal is multiplied in OBA multiplication node 5 by a variable value. This variable value is provided by the output of a linearization coefficient multiplication node 4. Multiplication node 4 provides at its output the product of multiplication between the linearization coefficient values provided by a linearization coefficient table 9 and the values contained in a reference value lookup table (LUT) 3. The LUT 3 contains values of pre-calibrated known quantities of antenna parameters. The linearization coefficient table 9 provides linear coefficients of a regression performed in the linearization table 9, this linearization taking place on OBA average values and eliminating thereby deterministic errors in the OBA value, as will be further described herein. The multiplication in the multiplication node 5 of the raw OBA signal 2 by the output product of linearization multiplication node 4 yields a corrected OBA signal value which is fed to a summation node 6. Summation node 6 performs an algebraic summation of the corrected OBA output from multiplication node 5 and the known system azimuth, further correcting the OBA by completing the cycle of correcting the differential error to produce a precise measure of the OBA value known as the error corrected instantaneous OBA value.

The process of correction is an iterative process performed by a feedback loop 22 which is made up of a data accumulator 7 connected to the output of OBA multiplication node 5. Accumulator 7 also receives current known azimuth data from the known azimuth input point 20. The corrected OBA values are accumulated in order of the reference azimuth angle provided to the accumulator at azimuth input point 20. This accumulated data is then passed to an average calculator 8 which calculates the averages of the OBA values accumulated in accumulator 7. The average values which are output from average calculator 8 are passed to the linearization coefficient table 9 which linearizes the average OBA value and passes linearization coefficient values on to linearization multiplication node 4. Linearization of the data in linearization coefficient table 9 is performed through commonly known linear regression techniques. Linear regression is a commonly recognized statistical method wherein data may be fit to a straight line equation. This linearization substantially eliminates the deterministic error commonly found the OBA values of known radars of this type. The linearized data is then multiplied in a linearization multiplication node 4 with the pre-calibrated antenna parameter information from lookup table 3. The output of linearization multiplication node 4 is fed to OBA multiplication node 5 as described above for subsequent summation.

Through the accumulation of corrected OBA values and averaging and linearization, these statistically corrected OBA values, when fed back and combined with the raw OBA values and known azimuth of the system, provide for a highly precise measure of the actual OBA value of the detected target. After averaging, linearization and summation, the output of summation node 6 will be a constant.

The statistical averaging and linearization performed in the feedback loop 22 substantially eliminates deterministic errors commonly found in systems used for differential error correction in monopulse receivers known presently in the art, an example of which is shown in FIG. 2. Such deterministic errors are commonly caused by variations of system tolerances and the effects of those tolerances on the antenna construction and design, as well as periodic time variations and thermal variations of the system, which could occur and produce errors in the same direction of the angular origin of the received radar signals. These deterministic errors, which produce inaccurate OBA detection in currently known differential error correction systems, are substantially eliminated through the use of the inventive feedback loop previously described.

The device as previously described also provides improved fault detection capabilities in radar receivers. This improved fault detection is a result of the ability to easily detect variations which occur suddenly within the measurement and correction time period, or variations which exceed pre-established linearization coefficient thresholds. These sudden or threshold exceeding variations provide information that a system fault may be present. This information, when used in conjunction with alarm status indicators currently known in the art, will allow for recognition of faults for which no individual fault detection circuits exist or have been applied. Thus, for example, if a sudden or threshold exceeding variation is received, and the remaining alarm status indications indicate operations within the norm, this could be an indication of a fault in the antenna, which until now, was provided with no individual fault detection circuit.

Thus, not only does the present invention provide an improved radar receiver which can correct for differential errors in the detected OBA as well as substantially eliminate deterministic errors, it also provides a system with improved fault detection capabilities.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, however, therefore, to be limited only as indicated by the scope of the claims appended hereto.

What is claimed is:
1. In combination:
   a radar receiver for receiving radar signals reflected from a target, said radar receiver having an antenna movable to define a variable antenna boresight axis and said receiver being capable of detecting an off-boresight angle between the boresight axis of the antenna and a target appearing within a beam of the antenna when the antenna boresight axis is at a known azimuth value, said radar receiver having an output for outputting a detected raw off-boresight angle value; and
   a device for correcting differential and deterministic errors in the detected raw off-boresight angle value of the radar receiver, said off-boresight angle correcting device comprising:

means for feeding back a variable value;

first means having a first input connected to said radar receiver and a second input connected to said feedback means for multiplying said raw off-boresight angle value by said variable value and having an output for outputting a corrected off-boresight angle value;

said feedback means comprising means for accumulating data, means for calculating averages of data, means for calculating linearization coefficients of data, means for looking up tabular reference calibration data relating to the antenna, and second means for multiplying linearization coefficients;

said data accumulating means having an input connected to said first multiplying means output for receiving said corrected off-boresight angle value and for sequentially accumulating said corrected off-boresight angle value in correlation with the known azimuth value and having an output for outputting said accumulated value;

said average calculating means having an input connected to said data accumulating means output for receiving accumulated corrected off-boresight angle values therefrom and for iteratively calculating an average value from said corrected off-boresight angle values, and having an output for outputting said average value;

said linearization coefficient calculating means having an input connected to said average calculating means output for receiving said average value and for calculating linearization coefficients of said average value so as to fit said average value to a linear regression line so that deterministic error in said detected raw off-boresight angle is substantially eliminated, said linearization coefficient calculating means having an output for outputting said linearization coefficients;

said lookup table means having an output for outputting tabular calibration reference data relating to said antenna;

said second multiplying means having a first input connected to said linearization coefficient calculating means output and a second input connected to said look up table means output for multiplying said linearization coefficients and said reference calibration data relating to the antenna to generate said variable value, said variable value being output by said second multiplying means to said first multiplying means;

said feedback means being connected between said first multiplying means output and said second input of the first multiplying means; and means for algebraically summing values, said summing means being connected to the output of said first multiplying means for summing the corrected off-boresight angle value from said first multiplying means with the known antenna azimuth value to substantially eliminate the differential error in said detected raw off-boresight angle and produce at an output of said summing means an error-corrected instantaneous off-boresight angle value.

2. A device for correcting differential and deterministic errors in a detected raw off-boresight angle value of a radar receiver having an antenna movable to define a variable antenna boresight axis and capable of detecting the raw off-boresight angle between a known boresight axis of the antenna and a target appearing within a beam of the antenna when the antenna boresight axis is at a known azimuth value, said off-boresight angle correcting device comprising:

means for feeding back a variable value;

first means having a first input connected to the radar receiver and a second input connected to said feedback means for multiplying said raw off-boresight angle value by said variable value and having an output for outputting a corrected off-boresight angle value;

said feedback means comprising means for accumulating data, means for calculating averages of data, means for calculating linearization coefficients of data, means for looking up tabular reference calibration data relating to the antenna, and second means for multiplying linearization coefficients;

said data accumulating means having an input connected to said first multiplying means output for receiving said corrected off-boresight angle value and for sequentially accumulating said corrected off-boresight angle value in correlation with the known azimuth value and having an output for outputting said accumulated value;

said average calculating means having an input connected to said data accumulating means output for receiving accumulated corrected off-boresight angle values therefrom and for iteratively calculating an average value from said corrected off-boresight angle values, and having an output for outputting said average value;

said linearization coefficient calculating means having an input connected to said average calculating means output for receiving said average value and for calculating linearization coefficients of said average value so as to fit said average value to a linear regression line so that deterministic error in said detected raw off-boresight angle is substantially eliminated, said linearization coefficient calculating means having an output for outputting said linearization coefficients;

said lookup table means having an output for outputting tabular calibration reference data relating to said antenna;

said second multiplying means having a first input connected to said linearization coefficient calculating means output and a second input connected to said look up table means output for multiplying said linearization coefficients and said reference calibration data relating to the antenna to generate said variable value, said variable value being output by said second multiplying means to said first multiplying means;

said feedback means being connected between said first multiplying means output and said second input of the first multiplying means; and means for algebraically summing values, said summing means being connected to the output of said first multiplying means for summing the corrected off-boresight angle value from said first multiplying means with the known antenna azimuth value to substantially eliminate the differential error in said detected raw off-boresight angle and produce at an output of said summing means an error-corrected instantaneous off-boresight angle value.

* * * * *